US012562841B2

(12) United States Patent
Dong

(10) Patent No.: US 12,562,841 B2
(45) Date of Patent: Feb. 24, 2026

(54) METHOD AND DEVICE FOR COMMUNICATION ON MULTIPLE LINKS

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 308 days.

(21) Appl. No.: 18/261,529

(22) PCT Filed: Jan. 18, 2021

(86) PCT No.: PCT/CN2021/072546
§ 371 (c)(1),
(2) Date: Jul. 14, 2023

(87) PCT Pub. No.: WO2022/151485
PCT Pub. Date: Jul. 21, 2022

(65) Prior Publication Data
US 2024/0080136 A1     Mar. 7, 2024

(51) Int. Cl.
*H04L 1/1607* (2023.01)
*H04L 1/1812* (2023.01)
*H04L 69/14* (2022.01)

(52) U.S. Cl.
CPC .......... *H04L 1/1642* (2013.01); *H04L 1/1812* (2013.01); *H04L 69/14* (2013.01)

(58) Field of Classification Search
CPC . H04L 1/12; H04L 1/16; H04L 1/1607; H04L 1/1642; H04L 1/1621; H04L 1/1628; H04L 1/1635; H04L 12/1868; H04L 51/23; H04L 69/14; H04L 45/245; H04L 1/1812; H04L 1/1864; H04L 1/1896; H04L 41/0894
See application file for complete search history.

(56) References Cited

U.S. PATENT DOCUMENTS

2010/0315999 A1* 12/2010 Kakani ................ H04L 1/0083
                                                        370/328
2012/0230317 A1  9/2012 Kim et al.
2014/0347985 A1  11/2014 Yi et al.
2018/0034595 A1  2/2018 Kim et al.
(Continued)

FOREIGN PATENT DOCUMENTS

CN     106506125 A    3/2017
CN     106656429 A    5/2017
(Continued)

OTHER PUBLICATIONS

Search Report for EP Application No. 21918685.5, dated Feb. 6, 2024, 7 pages.
(Continued)

*Primary Examiner* — Warner Wong
(74) *Attorney, Agent, or Firm* — Finnegan, Henderson, Farabow, Garrett & Dunner, L.L.P.

(57) ABSTRACT

A method for communication on multiple links, includes: receiving a first message frame, wherein the first message frame includes block acknowledgement policy information; and sending, based on the block acknowledgement policy information, a second message frame on a first link among the multiple links.

18 Claims, 3 Drawing Sheets

(56) References Cited

U.S. PATENT DOCUMENTS

| | | | | |
|---|---|---|---|---|
| 2018/0205502 A1* | 7/2018 | Merlin | | H04W 76/15 |
| 2019/0268099 A1* | 8/2019 | Chu | | H04B 7/2612 |
| 2020/0037288 A1* | 1/2020 | Huang | | H04W 72/30 |
| 2021/0083805 A1* | 3/2021 | Kneckt | | H04L 1/1642 |
| 2021/0211234 A1* | 7/2021 | Kneckt | | H04L 1/1614 |
| 2021/0211235 A1* | 7/2021 | Chu | | H04L 1/1614 |
| 2021/0212142 A1* | 7/2021 | Patil | | H04L 1/1614 |
| 2021/0227502 A1* | 7/2021 | Huang | | H04L 1/1614 |
| 2022/0014311 A1* | 1/2022 | Chitrakar | | H04L 5/0055 |
| 2022/0132610 A1* | 4/2022 | Guo | | H04L 47/34 |
| 2022/0312522 A1* | 9/2022 | Jang | | H04L 1/1621 |
| 2022/0322473 A1* | 10/2022 | Hwang | | H04W 76/15 |
| 2023/0011167 A1* | 1/2023 | Chitrakar | | H04W 74/0816 |
| 2023/0013454 A1* | 1/2023 | Gan | | H04W 76/15 |
| 2023/0079733 A1* | 3/2023 | Wu | | H04L 69/14 370/328 |
| 2023/0117751 A1* | 4/2023 | Kneckt | | H04W 80/02 370/329 |
| 2025/0202629 A1* | 6/2025 | Aio | | H04W 76/15 |

FOREIGN PATENT DOCUMENTS

| | | | | |
|---|---|---|---|---|
| CN | 107113112 A | | 8/2017 | |
| CN | 112074020 A | | 12/2020 | |
| CN | 115150028 | * | 10/2022 | H04L 1/16 |
| EP | 3716722 A1 | | 9/2020 | |
| EP | 3968731 A1 | | 3/2022 | |
| WO | WO 2017/076069 A1 | | 5/2017 | |
| WO | WO 2020/112020 A1 | | 6/2020 | |
| WO | WO-2020238812 A1 | * | 12/2020 | H04L 1/1864 |
| WO | WO-2021243818 A1 | * | 12/2021 | H04L 1/1607 |

OTHER PUBLICATIONS

Notice of Allowance in CN Application No. 202180000172.7, dated Mar. 19, 2024, 6 pages.

Guo, Gang et al., "IIEEE 802.11n MAC an Analysis of the IEEE 802.11n MAC Performance Optimization Strategy", *Computer Engineering & Science*, vol. 31, No. 3, 2009, School of Computer Science and Technology, Soochow University, Suzhou, China, 215006, 3 pages.

Intel Corporation, "Channel Access Mechanism for NR-unlicensed", 3GPP TSG RAN WG1 Meeting #98bis, R1-1910640, Chongqing, China, Oct. 14-20, 2019, 29 pages.

International Search Report of International Application No. PCT/CN2021/072546, dated Oct. 25, 2021, 4 pages.

* cited by examiner

410 — sending a first message frame

420 — receiving an acknowledgement frame for the first message frame

430 — sending a data frame

440 — sending a third message frame

450 — receiving a second message frame communication device 500

| receiving module 510 | processing module 520 | sending module 530 |

METHOD AND DEVICE FOR COMMUNICATION ON MULTIPLE LINKS

CROSS-REFERENCE TO RELATED APPLICATION

The present application is a U.S. National Stage of International Application No. PCT/CN2021/072546, filed on Jan. 18, 2021, the entire content of which is incorporated herein by reference.

TECHNICAL FIELD

The present disclosure relates to a field of communication, and more particularly, to a communication method and a communication device in wireless communication.

BACKGROUND

At present, a study scope of Wi-Fi technology is the transmission of 320 MHz bandwidth, aggregation and cooperation of a plurality of frequency bands, and the like, which is expected to increase a rate and throughput by at least four times compared with the existing standard and is mainly applied to scenarios such as video transmission, AR (Augmented Reality), VR (Virtual Reality), and the like.

The aggregation and cooperation of the plurality of frequency bands mean that devices simultaneously communicate with each other in frequency bands such as 2.4 GHz, 5.8 GHz, 6 GHz and the like. New MAC (Media Access Control) mechanisms need to be defined to manage the communication between devices in the plurality of frequency bands at the same time. In addition, it is expected that multi-band aggregation and cooperation may support low latency transmission.

Currently, the maximum bandwidth supported by the multi-band aggregation and system technology is 320 MHz (i.e. 160 MHz+160 MHz), with the possibility of supporting 240 MHz (i.e. 160 MHz+80 MHz) and other bandwidths.

In the prior art, a Station (STA) and an Access Point (AP) may be a multi-link device (MLD), i.e., a function that supports simultaneous sending and/or receiving on multiple links at the same time. Thus, in the prior art, there may be multiple links between the STA and the AP, and the communication between the two devices on multiple links is being researched under research.

The access point and station may set up a session for data transmission through a BA (block acknowledgement: Block Ack) mechanism. However, the BA mechanism in the existing standard is only applicable for the single link, so it needs to be enhanced.

SUMMARY

According to a first aspect of embodiments of the present disclosure, a communication method on multiple links is provided and may include: receiving a first message frame, where the first message frame includes block acknowledgement policy information; sending, based on the block acknowledgement policy information, a second message frame on a first link among the multiple links.

According to a second aspect of embodiments of the present disclosure, a communication method on multiple links is provided and may include: sending a first message frame, where the first message frame includes block acknowledgement policy information; receiving a second message frame on a first link among the multiple links, where the first link is determined based on the block acknowledgement policy information.

According to a third aspect of embodiments of the present disclosure, an electronic device is provided and includes a processor and a memory storing a computer program executable by the processor. The processor is configured to: receive a first message frame, where the first message frame includes block acknowledgement policy information, and send, based on the block acknowledgement policy information, a second message frame under a first link among multiple links.

According to a fourth aspect of embodiments of the present disclosure, an electronic device is provided and includes a processor and a memory storing a computer program executable by the processor. The processor is configured to: send a first message frame, where the first message frame includes block acknowledgement policy information; and receive a second message frame under a first link among multiple links, where the first link is determined based on the block acknowledgement policy information.

BRIEF DESCRIPTION OF THE DRAWINGS

Example embodiments of the present disclosure will be described in detail below with reference to the accompanying drawings.

DETAILED DESCRIPTION

The following description referring to the accompanying drawings is provided to facilitate a comprehensive understanding of various embodiments of the present disclosure defined by the appended claims and their equivalents. The various embodiments of the present disclosure include various details, but these details are only illustrative. In addition, the description of well-known technologies, functions, and constructions may be omitted for clarity and conciseness.

Terms and words used in the present disclosure are not limited to written meanings, but are used by inventors to enable a clear and consistent understanding of the present disclosure. Therefore, for those skilled in the art, the description of various embodiments of the present disclosure is provided only for the purpose of illustration, but not for the purpose of limitation.

It should be understood that "a", "an", "said", and "the" in singular forms used herein may also include plural forms, unless clearly indicated in the context otherwise. It should be further understood that the word "include" used in the present disclosure refers to the existence of described features, integers, steps, operations, elements, and/or assemblies, but does not exclude the existence or addition of one or more other features, integers, steps, operations, elements, assemblies, and/or groups thereof.

It should be understood that although the terms "first" and "second" and the like may be used herein to describe various elements, these elements should not be limited by these terms. These terms are only used to distinguish one element from another. Therefore, a first element discussed below may be referred to as a second element without departing from the teaching of the embodiments.

It should be understood that when an element is referred to as being "connected" or "coupled" to another element, it may be directly connected or coupled to other elements, or intervening elements may also exist. In addition, as used herein, "connected" or "coupled" may include wireless connection or wireless coupling. The term "and/or" or the expression "at least one of . . . " used herein includes any and all combinations of one or more related listed items.

Unless otherwise defined, all terms used herein, including technical and scientific terms, have the same meaning as generally understood by those skilled in the art to which the present disclosure belongs.

Embodiments of the present disclosure will be described in detail below in connection with the accompanying drawings.

Figure 1:
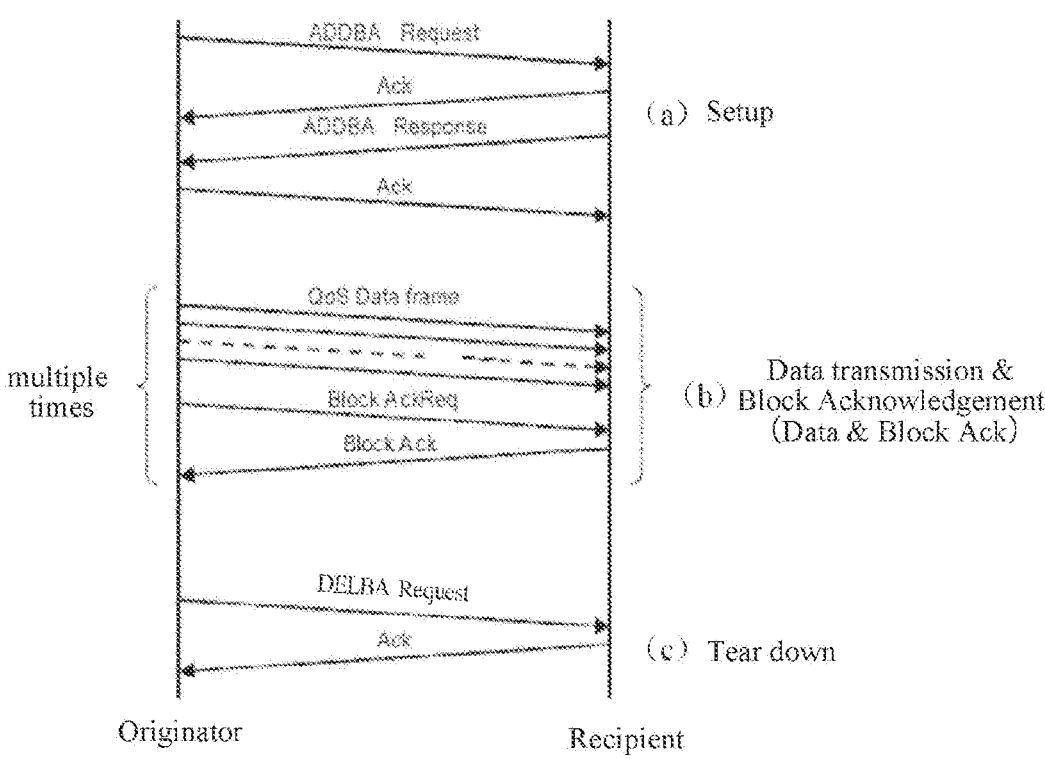
FIG. 1 is a diagram illustrating an example of a BA mechanism according to an embodiment.

FIG. 1 is a diagram illustrating an example of a BA mechanism according to an embodiment.

Referring to FIG. 1, during (a) a setup phase, an originator and a recipient initiate a session by means of a handshake of an ADDBA Request (Add Block Acknowledgement Request) frame and an ADDBA Response frame. Both the ADDBA Request frame and the ADDBA Response frame may be management frames and may exist in the form of Action frames. The management frames (the ADDBA Request frame and the ADDBA Response frame) need to be acknowledged by Ack (Acknowledgment). As illustrated in FIG. 1, a process of setting up the session is as follows: the originator sending an ADDBA Request frame to the recipient; the recipient returns an Ack for indicating that the ADDBA Request frame has been received, and then the recipient sends an ADDBA Response frame for the ADDBA Request frame; and the originator returns an Ack for indicating the ADDBA Response frame has been received.

After a session is set up, during (b) a data transmission & block acknowledgement phase, e.g., during a transmission opportunity (TXOP: transmission opportunity), the originator may send a plurality of data frames continuously, for example, a quality of service (QoS: Quality of Service) data frame (i.e., the QoS Data frame of FIG. 1), and after the data frame transmission ends, send a Block Acknowledgement Request (Block Ack Req); the recipient returns a Block Acknowledgement (BA: Block Ack) for the plurality of data frames.

The session may be closed after the Block Ack Acknowledgement completes. Specifically, during (c) a tear down phase, the originator may send a DELBA Request frame and the recipient then returns an Ack.

During (a) the setup phase, a format of the ADDBA request frame sent by the originator to the recipient may be as illustrated in Table 1 below.

TABLE 1

| Format of the ADDBA Request Frame Action Field | |
| --- | --- |
| Order | Information |
| 1 | Category |
| 2 | Block Ack Action |
| 3 | Dialog Token |
| 4 | Block Ack Parameter Set |
| 5 | Block Ack Timeout Value |
| 6 | Block Ack Starting Sequence Control |
| 7 | GCR Group Address element (optional) |

TABLE 1-continued

| Format of the ADDBA Request Frame Action Field | |
| --- | --- |
| Order | Information |
| 8 | Multi-band (optional) |
| 9 | TCLAS (optional) |
| 10 | ADDBA Extension (optional) |

Referring to Table 1, the ADDBA request frame may include: a Category field, a Block Ack Action field, a Dialog Token field, a Block Ack Parameter Set field, a Block Ack Timeout Value, and a Block Ack Starting Sequence Control field. In addition, optionally, the ADDBA request frame may also include: a GCR (Groupcast with Retries) Group Address Element field, a Multi-band field, a TCLAS field and an ADDBA Extension field.

The Block Ack Parameter Set field of Table 1 may be defined as illustrated in Table 2 below.

TABLE 2

| Block Ack Parameter Set Fixed Field | | | |
| --- | --- | --- | --- |
| B0 | B1 | B2  B5 | B6  B15 |
| A-MSDU Supported (Support A-MSDU) | Block Ack Policy (BA Policy) | TID | Buffer Size |
| Bits: 1 | 1 | 4 | 10 |

In Table 2, the MSDU may indicate a MAC Service Data Unit. The BA policy may be used to define whether the Ack is an immediate response or a delay response. The TID may indicate a communication identifier (a traffic identifier). The Buffer Size may indicate a number of buffers available for a particular TID. For example, when the A-MSDU Supported domain indicated by the Block Ack Parameter Set domain sent by the station is equal to 0, a number of bytes that each buffer may hold is equal to a maximum value of the MSDU. When the A-MSDU Supported domain equals 1 indicated by the station, a number of bytes that each buffer may hold is equal to the maximum value of the A-MSDU supported by the station.

It should be understood that each element illustrated in the Table 1 to Table 2 exists independently, and these elements are listed as examples in the same table, which, however, does not mean that all elements in the table must exist simultaneously as illustrated in the table. A value of each element is not dependent on a value of any other element in the Table 1 to Table 7. Thus, those skilled in the art may understand that the value of each element in the tables of the present disclosure is an independent embodiment.

A BA mechanism in multi-link communication is described below.

Figure 2:
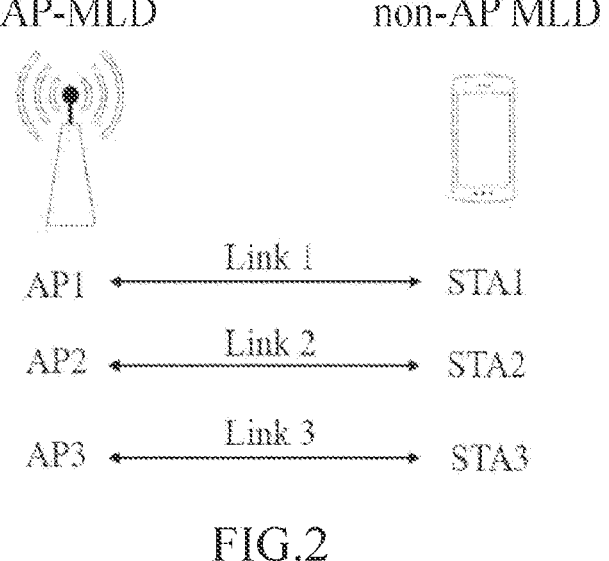
FIG. 2 is a diagram illustrating a scenario of multi-link communication according to an embodiment.

FIG. 2 is a diagram illustrating a scenario of multi-link communication according to an embodiment.

In a wireless local area network, a Basic Service Set (BSS) may consist of an access point (AP) and one or a plurality of devices (non-AP STA, referred to as a "station" herein) that communicate with the AP. The Basic Service Set may be connected to a Distribution System (DS) through its AP, and then connected to another Basic Service Set, to form an Extended Service Set (ESS).

The AP is a wireless switch used for a wireless network and is also a core of the wireless network. The AP device may be used as a wireless base station and is mainly used as a bridge to connect the wireless network and a wired network. With this access point AP, the wired and wireless networks may be integrated.

The AP may include software applications and/or circuits to enable other types of nodes in the wireless network to communicate with outside and inside of the wireless network via the AR In some examples, the AP may be a terminal device or a network device equipped with a Wireless Fidelity (Wi-Fi) chip by way of example.

For example, the non-AP STA may include, but is not limited to: a cellular phone, a smart phone, a wearable device, a computer, a Personal Digital Assistant (PDA), a Personal Communication System (PCS) device, a Personal Information Manager (PIM), a Personal Navigation Device (PND), a global positioning system, a multimedia device, an Internet of Things (IoT) device, and the like.

In embodiments of the present disclosure, the AP and the non-AP STA may be devices supporting multi-link communication, which may, for example, be denoted as an AP MLD and a non-AP STA MLD, respectively. For ease of description, an example in which one AP communicates with one STA on multiple links is mainly described in the following, which is not limited in the embodiments of the present disclosure.

In FIG. 2, as an example only, the AP MLD may represent an access point supporting multi-link communication, and the non-AP STA MLD may represent a station supporting the multi-link communication. Referring to FIG. 2, the AP MLD may work on three links, such as AP1, AP2 and AP3 illustrated in FIG. 2, and the non-AP STA MLD may also work on three links, such as STA1, STA2 and STA3 illustrated in FIG. 2. In the example of FIG. 2, it is assumed that AP1 communicates with STA1 through a corresponding first link Link 1. Similarly, AP2 and AP3 communicate with STA2 and STA3 through a second link Link 2 and a third link Link 3, respectively. Moreover, Link 1 to Link 3 may be multiple links at different frequencies, for example, links at 2.4 GHz, 5 GHz, 6 GHz, and the like, or several links with the same or different bandwidths at 2.4 GHz, 5 GHz, or 6 GHz. In addition, there may exist a plurality of channels on each link. However, it should be understood that the communication scenario illustrated in FIG. 2 is only illustrative, and the inventive concept is not limited thereto. For example, the AP MLD may be connected to a plurality of non-AP STA MLDs, or the AP MLD may communicate with a plurality of other types of stations on each link.

In addition, although it is illustrated in FIG. 2 that the first link Link 1 to the third link Link 3 belong to the same AP MLD, the embodiments of the present disclosure are not limited to this. For example, the first link Link 1 to the third link Link 3 may be a link shared by the AP MLD illustrated in FIG. 2 with other AP MLDs.

In addition, although the number of the multiple links between the AP MLD and the non-AP STA MLD is three, as illustrated in FIG. 2, the embodiments of the present disclosure is not limited thereto, and there may be more or less links therebetween.

Combined with FIG. 1, one of the AP MLD and the non-AP STA MLD may serve as the originator and the other may serve as the recipient. During (a) the setup phase, an originator multi-link device may be set up with a recipient multi-link device on any of multiple links. In an embodiment, at least one session communication between the originator multi-link device and the recipient multi-link device may be set up on one of the multiple links, for example, the session communication on Link 1 may be initiated by using the Link 1. In addition, the session communication on Link 2 and/or Link 3 may be initiated by using the Link 1. In (b) the data transmission & block acknowledgment phase, the data transmission may be performed on at least one link, and the data received on other links (such as an MPDU (MAC Protocol Data Unit) may be acknowledged through a BA frame on one link. In (c) the tear down phase, at least one session communication may be deleted, as an example, all setup session communication may be deleted on one link or BA corresponding to a plurality of traffic identifiers (TIDs) may be deleted.

Figure 3:
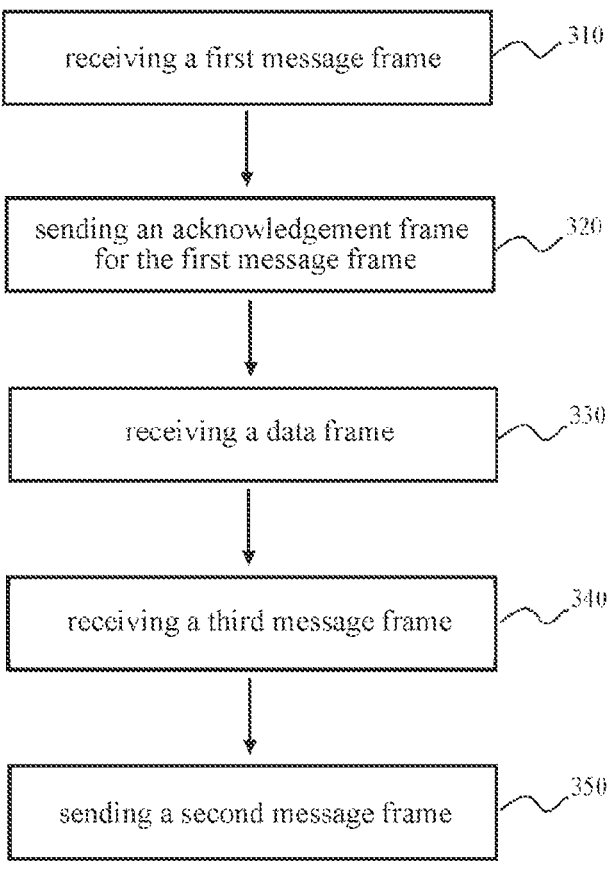
FIG. 3 is a flowchart illustrating a communication method according to an embodiment.

FIG. 3 is a flowchart illustrating a communication method according to an embodiment of the present disclosure.

The flowchart of FIG. 3 may be an operation performed by the recipient, and accordingly, FIG. 4 to be described below may be an operation performed by the originator. For example, the recipient may be one of the AP MLD and the non-AP STA MLD, and accordingly, the originator may be the other of the AP MLD and the non-AP STA MLD.

Referring to FIG. 3, in step 310, a first message frame may be received, where the first message frame includes block acknowledgment policy information. In an embodiment, the first message frame may be an add block acknowledgment request frame (ADDBA Request) described with reference to FIG. 1 and Table 1, and the block acknowledgment policy information may be a block acknowledgment policy subframe (Block Ack Policy) described with reference to FIG. 1 and Table 2.

The block acknowledgment policy information may be associated with a traffic identifier (TID) according to the embodiment. For example, when the TID value is relatively large and a service corresponding to the traffic identifier TID is a service having a relatively high requirement for latency (i.e., a low-latency service), an immediate response may be indicated by setting the block acknowledgement policy information in the first message frame (for example, the block acknowledgement policy sub-domain in Table 2 is set to 1). When the TID value is relatively small and a service corresponding to the traffic identifier TID is a service having a relatively low requirement for a service latency, a delay response may be indicated by setting the block acknowledgement policy information in the first message frame (for example, the block acknowledgement policy sub-domain in the Table 2 is set to 0).

In step 320, an acknowledge frame (Ack) for the ADDBA request frame may be sent.

Next, although not illustrated, the communication method illustrated in FIG. 3 may include transmission of other frames. For example, the ADDBA response frame and an acknowledgement frame for the ADDBA response frame, as illustrated in FIG. 1, are transmitted between the recipient and the originator, thereby completing the session setup.

In step 330, a QoS data frame (such as the MPDU) may be received. For example, the MPDU may be transmitted on at least one link among the multiple links.

In step 340, a third message frame may be received. The third message frame may include a starting sequence number, where the starting sequence number is set based on a traffic identifier (TID) in the first message frame. For example, the starting sequence number may be set to the minimum value of a sequence number corresponding to the traffic identifier (TID). As an example, the third message frame may be a BA Request frame (BA Request). In the embodiment of the present disclosure, setting the starting sequence number as the minimum value of the sequence number corresponding to the TID may facilitate the recipient to generate the BA frame.

In step 350, a second message frame may be sent on a first link among the multiple links based on the block acknowledgment policy information. As an example, the second message frame may be a BA frame.

According to the embodiment, the first link for sending the second message frame is determined based on the block acknowledgment policy information. For example, a first link may be determined among the multiple links based on a response type indicated by the block acknowledgment policy information, so as to send a second message frame. According to the embodiment, the response type indicated by the block acknowledgment policy information may be associated with a traffic identifier (TID). For example, the response type may include at least two types, such as an immediate response or a delay response, and the block acknowledgment policy information may indicate the immediate response or the delay response corresponding to the TID, similar to the embodiments described above.

According to the embodiment, in a case where the response type is a first type (e.g., immediate response), the first link for sending the second message frame (e.g., BA frame) is a link for setting up a session or a link for transmitting a last MPDU. Combined with FIG. 2, the link for setting up the session may be the Link 1, the MPDU (QoS data) may be transmitted on multiple links (e.g., Link 1 to Link 3), the link for transmitting the last MPDU may be the Link 2, if the block acknowledgment policy information in the first message frame (ADDBA request frame) indicates the immediate response, the BA frame (i.e., the second message frame) for all transmitted MPDUs (QoS data) may be sent on the Link 1 or the Link 2.

According to the embodiment, in the case where the response type is a second type (e.g., delay response), the first link for transmitting the second message frame (e.g., BA frame) may be a link for setting up a session or a link other than a link for transmitting a last MPDU. Combined with FIG. 2, the link for setting up the session may be the Link 1, the MPDU (QoS data) may be transmitted on multiple links (e.g., Link 1 to Link 3), and the link for transmitting the last MPDU may be the Link 2, if the block acknowledgment policy information in the first message frame (ADDBA request frame) indicates the immediate response, the BA frame (i.e., the second message frame) for all transmitted MPDUs (QoS data) may be sent on the Link 1 or the Link 3.

According to the embodiment, the last MPDU received by the recipient from the originator may include information about time lengths of the third message frame (e.g., BA request frame) and the second message frame (e.g., BA frame). The information carried with the time length may inform other devices not to occupy the channel in the following time length, so as to ensure the transmission of the BA request frame and the BA frame.

According to the embodiment, generation and reply of the BA frame may be acknowledged according to a service requirement corresponding to the traffic identifier (TID) in the ADDBA request frame. For example, if the TID corresponds to the low-latency service, the BA frame is limited to be sent on current link; if the TID corresponds to a service that does not have high requirement for the latency, the BA may, for example, be sent on the current link or other links according to a channel condition. According to the embodiment, in the ADDBA request frame, a block acknowledgment policy sub-frame (Block Ack Policy) is correspondingly set to the TID. For example, if the TID value is relatively large and the service latency corresponding to the traffic identifier is relatively low, the block acknowledgement policy sub-domain may be correspondingly set to "1", so as to to identify the immediate response. In this case, both the recipient and the originator may send the BA frame on a link where the BA mechanism is set up or on a link where the last MPDU is received at the latest, where the last MPDU may include the BA request frame and information of the time length of the BA frame. For example, if the TID value is relatively small, the block acknowledgment policy sub-domain may be accordingly set to "0" to identify the delay responses, and in this case, both parties may receive the BA on the link set up by the BA mechanism or on other links.

According to the embodiment, the generation of the BA frame described in the above embodiment is initiated by the BA request frame sent by the originator transmitting the MPDU.

An SN (sequence number) in the BA request frame may be set according to the embodiment. For example, the minimum value of the SN corresponding to the TID received by the recipient is used as an SSN (starting sequence number).

It should be understood that the steps of the communication method illustrated in FIG. 3 are merely examples, and embodiments of the present disclosure are not limited thereto, and for example, some steps may be merged or omitted and others may be included. In an embodiment, although not illustrated, the communication method illustrated in FIG. 3 may further include exchanging multi-link operation capability information in the process of setting up a session, where the multi-link operation capability information may indicate enhanced multi-link multi-radio communication (EMLMR) or enhanced multi-link single-radio communication (EMLSR). In the case of the enhanced multi-link multi-radio communication, the last MPDU may be a MPDU that completes the transmission at the latest among the plurality of MPDUs which are sent in parallel on the multiple links, in the case of the enhanced multi-link single-radio communication, the last MPDU may be a MPDU that is transmitted at the latest and is serially sent on one link.

Figure 4:
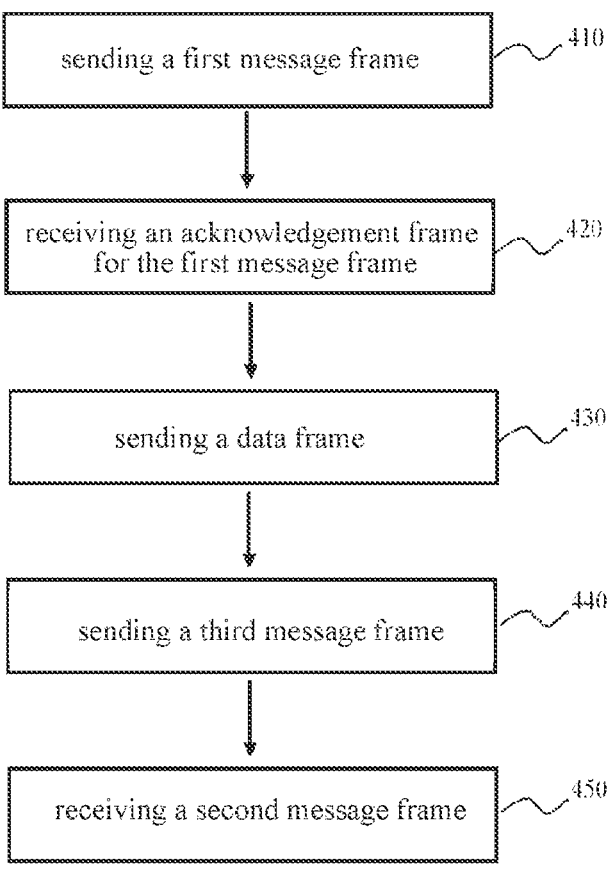
FIG. 4 is a flowchart illustrating another communication method according to an embodiment.

FIG. 4 is a flowchart illustrating another communication method according to an embodiment of the present disclosure. The flowchart of FIG. 4 may be an operation performed at the originator, i.e., the operation corresponding to the operation of the recipient illustrated in FIG. 3.

Referring to FIG. 4, in step 410, a first message frame may be sent, where the first message frame includes block acknowledgment policy information. According to the embodiment, the first message frame may be an ADDBA request frame, and the block acknowledgement policy information may be correspondingly set to the traffic identifier (TID), which may be similar to the description referring to step 310 of FIG. 3, and repeated descriptions are omitted for conciseness.

In step 420, an acknowledgement frame for the first message frame may be received.

Next, although not illustrated, the communication method illustrated in FIG. 4 may include transmission of other frames. For example, the ADDBA response frame and an acknowledgement frame for the ADDBA response frame, as illustrated in FIG. 1, are transmitted between the originator and the recipient, thereby completing the session setup.

In step 430, a QoS data frame (such as the MPDU) may be sent. For example, the MPDU may be transmitted on at least one link of the multiple links.

In step 440, a third message frame may be sent. For example, a third message frame may be sent on any of the multiple links. For example, the third message frame may be a BA request frame. The third message frame may include a starting sequence number, where the starting sequence number is set based on a traffic identifier in the first message frame. For example, the starting sequence number may be set to the minimum value of a sequence number corresponding to the traffic identifier.

In step 450, a second message frame may be received on a first link among multiple links, w % here the first link is determined based on the block acknowledgment policy information. According to the embodiment, the first link is determined based on a response type indicated by the block acknowledgment policy information. According to the embodiment, the response type is associated with the traffic identifier in the first message frame. According to an embodiment, in a case where the response type is a first type (e.g., immediate response), the first link is a link for setting up a session, or a link for transmitting a last MPDU; in a case where the response type is a second type (e.g., delay response), the first link is a link for setting up a session, or a link other than a link for transmitting a last MPDU. According to the embodiment, the last MPDU may include information about time lengths of the third message frame and the second message frame.

It should be understood that the steps of the communication method illustrated in FIG. 4 are merely examples, and the embodiments of the present disclosure are not limited thereto, and for example, some steps may be merged or omitted and others may be included. In an embodiment, although not illustrated, the communication method illustrated in FIG. 4 may further include exchanging multi-link operation capability information in the process of setting up a session. According to the embodiment, the multi-link operation capability information indicates enhanced multi-link multi-radio communication or enhanced multi-link single-radio communication.

The steps described in FIG. 4 correspond to the steps of FIG. 3 respectively, and repeated descriptions are omitted for conciseness.

Figure 5:
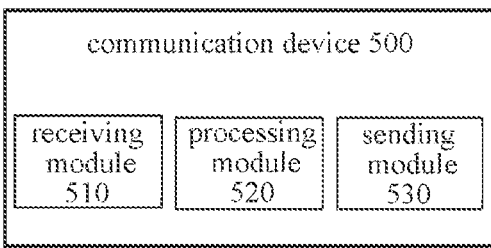
FIG. 5 is a block diagram illustrating a communication device according to an embodiment.

FIG. 5 is a block diagram illustrating a communication device 500 according to an embodiment of the present disclosure. The communication device 500 may include a receiving module 510, a processing module 520, and a sending module 530.

The communication device 500 illustrated in FIG. 5 may be applied to a recipient. In this case, the receiving module 510 may be configured to receive a first message frame, where the first message frame includes block acknowledgment policy information. The processing module 520 may be configured to determine a first link among multiple links based on the block acknowledgment policy information: The sending module 530 may be configured to send a second message frame on the first link. In other words, when the communication device 500 illustrated in FIG. 5 may be applied to the recipient, the receiving module 510, the processing module 520 and the sending module 530 may perform operations described with reference to FIG. 3, and repeated descriptions are omitted for conciseness.

The communication device 500 illustrated in FIG. 5 may be applied to an originator. In this case, the processing module 520 may be configured to determine a first message frame, where the first message frame includes block acknowledgment policy information: The sending module 530 may be configured to send the first message frame; The receiving module 510 may be configured to receive a second message frame on a first link among multiple links, where the first link is determined based on the block acknowledgment policy information. In other words, when the communication device 500 illustrated in FIG. 5 may be applied to the originator, the processing module 520, the sending module 530 and the receiving module 510 may perform operations described with reference to FIG. 4, and repeated descriptions are omitted for conciseness.

In addition, the communication device 500 shown in FIG. 5 is only illustrative, and embodiments of the present disclosure are not limited thereto. For example, the communication device 500 may further include other modules, such as a memory module. In addition, various modules in the communication device 500 may be combined into more complex modules, or may be divided into more separate modules to support various functions.

Referring to the communication method described in FIGS. 3 and 4 and the communication device described in FIG. 5, parameters for sending and acknowledging the BA frame in the multi-link communication are set such that the spectrum utilization efficiency is improved.

Based on the same principle as the method provided by embodiments of the present disclosure, the embodiments of the present disclosure further provide an electronic device, which includes a processor and a memory. Machine-readable instructions (which may also be referred to as a "computer program") are stored in the memory; and the processor is configured to perform the machine-readable instructions to implement the methods described with reference to FIGS. 3 and 4.

Embodiments of the present disclosure further provide a non-transitory computer-readable storage media having a computer program stored thereon, which, when executed by a processor, implements the methods described with reference to FIGS. 3 and 4.

In embodiments, the processor may be configured to implement or execute various illustrative logical blocks, modules and circuits described in connection with the present disclosure, for example, a Central Processing Unit (CPU), a general-purpose processor, a Digital Signal Processor (DSP), an Application Specific Integrated Circuit (ASIC), a Field Programmable Gate Array (FPGA), or other programmable logic devices, transistor logic devices, hardware components, or any combination thereof. The processor may also be a combination that implements computing functions, including, for example, a combination of one or more microprocessors, a combination of the DSP and a microprocessor, and the like.

In embodiments, the memory may be, for example, a Read Only Memory (ROM), a Random Access Memory (RAM), an Electrically Erasable Programmable Read Only Memory (EEPROM), a Compact Disc Read Only Memory (CD-ROM) or other CD storage, an optical disk storage (including a compressed disk, a laser disk, an optical disk, a digital universal disk, a Blu-ray disk, etc.), a magnetic disc storage media or other magnetic storage devices, or any other media that can be used to carry or store program codes in the form of instructions or data structures and that can be accessed by a computer, but the memory is not limited to this.

It should be understood that although respective steps in the flowcharts of the drawings are displayed in sequence according to the indication of arrows, these steps are not necessarily performed in the sequence indicated by the arrows. Unless otherwise explicitly specified in the present disclosure, execution of these steps is not strictly limited by the sequence, and the steps may be performed in other sequences. In addition, at least part of the steps in the flowcharts of the drawings may include a plurality of sub-steps or a plurality of stages. These sub-steps or stages are not necessarily completed at the same moment, but may be performed at different moments. Besides, these sub-steps or stages may not be necessarily performed sequentially, but may be performed in turn or alternately with other steps or at least part of sub-steps or stages of other steps.

Although the present disclosure has been shown and described with reference to certain embodiments of the present disclosure, it will be understood by those skilled in the art that various changes in forms and details may be made without departing from the scope of the present disclosure. Therefore, the scope of the present disclosure should not be limited by the embodiments, but should be defined by the appended claims and their equivalents.

What is claimed is:

1. A method for communication on multiple links, comprising:

receiving a first message frame, wherein the first message frame comprises block acknowledgement policy information; and sending, based on the block acknowledgement policy information, a second message frame on a first link among the multiple links;

wherein the sending, based on the block acknowledgement policy information, the second message frame on the first link among the multiple links comprises:

sending the second message frame by determining the first link among the multiple links based on a response type indicated by the block acknowledgement policy information.

2. The method according to claim 1, wherein the response type is associated with a traffic identifier in the first message frame.

3. The method according to claim 1, wherein the response type is a first type, and the first link is one of a link for setting up a session, or a link for transmitting a last media access control protocol data unit (MPDU).

4. The method according to claim 1, wherein the response type is a second type, and the first link is one of a link for setting up a session, or a link other than a link for transmitting a last media access control protocol data unit (MPDU).

5. The method according to claim 1, further comprising: receiving a third message frame, wherein the third message frame comprises a starting sequence number based on a traffic identifier in the first message frame.

6. The method according to claim 5, wherein the starting sequence number is set to a minimum value of a sequence number corresponding to the traffic identifier.

7. The method according to claim 5, wherein a last media access control protocol data unit (MPDU) comprises information about a time length of the third message frame and a time length of the second message frame.

8. The method according to claim 1, further comprising: exchanging multi-link operation capability information in a process of setting up a session, wherein the multi-link operation capability information indicates enhanced multi-link multi-radio communication or enhanced multi-link single-radio communication.

9. The method according to claim 1, wherein the first message frame is an add block acknowledgement (ADDBA) request frame, and the second message frame is a block acknowledgement (BA) response frame.

10. A method for communication on multiple links, comprising:

sending a first message frame, wherein the first message frame comprises block acknowledgement policy information; and receiving a second message frame on a first link among the multiple links, wherein the first link is determined based on the block acknowledgement policy information;

wherein the first link is determined based on a response type indicated by the block acknowledgement policy information.

11. The method according to claim 10, wherein the response type is associated with a traffic identifier in the first message frame.

12. The method according to claim 10, wherein the response type is a first type, and the first link is one of a link for setting up a session, or a link for transmitting a last media access control protocol data unit (MPDU).

13. The method according to claim 10, wherein the response type is a second type, and the first link is one of a link for setting up a session, a link other than a link for transmitting a last media access control protocol data unit (MPDU).

14. The method according to claim 10, further comprising: sending a third message frame, wherein the third message frame comprises a starting sequence number based on a traffic identifier in the first message frame.

15. The method according to claim 14, wherein the starting sequence number is set to a minimum value of a sequence number corresponding to the traffic identifier.

16. The communication method according to claim 14, wherein a last media access control protocol data unit (MPDU) comprises information about a time length of the third message frame and a time length of the second message frame.

17. An electronic device, comprising:

a processor; and a memory storing a computer program executable by the processor, wherein the processor is configured to:

receive a first message frame, wherein the first message frame comprises block acknowledgement policy information; and send, based on the block acknowledgement policy information, a second message frame on a first link among multiple links;

wherein in sending the second message frame, the processor is further configured to:

send the second message frame by determining the first link among the multiple links based on a response type indicated by the block acknowledgement policy information.

18. An electronic device, comprising:

a processor; and a memory storing a computer program executable by the processor, wherein the processor is configured to perform the method according to claim 10.

* * * * *